US005670595A

United States Patent [19]

Meka et al.

[11] Patent Number: 5,670,595

[45] Date of Patent: Sep. 23, 1997

[54] DIENE MODIFIED POLYMERS

[75] Inventors: Prasadaro Meka, Seabrook, Tex.; Kunihiko Imanishi, Iruma-gun, Japan; Gary Frederick Licciardi, Humble; Avinash Chandrakant Gadkari, Houston, both of Tex.

[73] Assignee: Exxon Chemical Patents Inc., Houston, Tex.

[21] Appl. No.: 520,010

[22] Filed: Aug. 28, 1995

[51] Int. Cl.$^6$ ......................... C08F 236/20; C08F 232/06

[52] U.S. Cl. ......................... 526/336; 526/126; 526/127; 526/131; 526/134; 526/160; 526/161; 526/170; 526/281; 526/282; 526/283; 526/339; 522/150; 522/158

[58] Field of Search .................................... 526/134, 160, 526/170, 282, 283, 336, 281, 126, 127, 131, 161, 169, 169.2, 339; 522/150, 158

[56] References Cited

U.S. PATENT DOCUMENTS

| | | | |
|---|---|---|---|
| 3,351,621 | 11/1967 | Bacskai . | |
| 3,984,610 | 10/1976 | Elston . | |
| 4,366,296 | 12/1982 | Kitagawa et al. . | |
| 4,551,503 | 11/1985 | Lal et al. . | |
| 4,626,467 | 12/1986 | Hostetter . | |
| 4,999,409 | 3/1991 | Doi et al. . | |
| 5,219,968 | 6/1993 | Shiomura et al. | 526/283 |
| 5,225,501 | 7/1993 | Fujita et al. | 526/160 X |
| 5,243,001 | 9/1993 | Winter . | |
| 5,272,236 | 12/1993 | Lai et al. . | |
| 5,391,789 | 2/1995 | Rohrmann | 526/160 X |
| 5,416,177 | 5/1995 | Siedle et al. | 526/336 X |
| 5,552,489 | 9/1996 | Merrill et al. | 526/160 X |

FOREIGN PATENT DOCUMENTS

| | | |
|---|---|---|
| 190889A | 8/1986 | European Pat. Off. . |
| 0 190 889 | 8/1986 | European Pat. Off. . |
| 0 351 866 | 1/1990 | European Pat. Off. . |
| 0 384 431 | 8/1990 | European Pat. Off. . |
| 512741A | 11/1992 | European Pat. Off. . |
| 573862A | 12/1993 | European Pat. Off. . |
| 667359A | 8/1995 | European Pat. Off. . |
| 91 17194A | 11/1991 | WIPO . |

OTHER PUBLICATIONS

Die Makroomolekulare Chemie, vol. 194, No.12, Dec. 1993 Basel, pp. 3499–3504, XP 000411898, Soga Kazuo 'Activation of Si02 Supported Zirconocene Catalysts . . . '.

Yoo, H. J., et al; Rheology of High Melt Strength Polypropylene, Antec '92: 569–572.

Bradley, M. B., et al; Novel Polypropylenes for Foaming on Conventional Equipment, Plastics Engineering Mar., '91: 82–84.

Bradley, M. B., et al; Novel Foamable Polypropylene Polymers, Antec '90: 717–720.

McHugh, K. E., et al; High Melt Strength Polypropylene for Melt Phase Thermoforming, Antec '90: 452–455.

*Primary Examiner*—Fred Teskin
*Attorney, Agent, or Firm*—C. Paige Schmidt

[57] ABSTRACT

Diene modified polymers are provided as well as methods for preparing the same. The polymers have from 3-8 carbon atoms, from about 0.00005 to about 5 mole percent diene based on the total weight of the polymer. The polymers are essentially gel-free and exhibit enhanced melt strength and shear thinning behavior.

29 Claims, 4 Drawing Sheets

DIENE MODIFIED POLYMERS

FIELD OF THE INVENTION

This invention relates to diene modified polymers, particularly diene modified polypropylenes, which are produced using metallocene catalyst systems. The polymers so produced exhibit enhanced melt strength and shear thinning behavior and have a broad molecular weight distribution as compared to homopolymers and Zeigler Natta catalyzed copolymers.

BACKGROUND

Polypropylene and related polymers are known to have low melt strength. This is a significant deficiency in key application areas such as thermoforming and blow molding. Polyethylene on the other hand is used extensively in blown film applications requiring good melt strength. The limitations in the melt strength of polypropylenes show up as excess sag in sheet extrusion, rapid thinning of walls in parts thermoformed in the melt phase, low draw-down ratios in extrusion coating, poor bubble formation in extrusion foam materials, and relative weakness in large-part blow molding. Thus, it would be highly desirable to produce polypropylene and related polymers having enhanced melt strength as well as commercially valuable processability.

Increasing the melt strength of polymers such as polypropylene has been an industrial goal for well over ten years, however, success has been limited. The desirable properties that have made low density polyethylene commercially successful are attributed in large part to high melt strength and excellent processability. Both of these properties are attributed to the presence of long chain branching which is thought to occur under high pressure polymerization conditions.

There has been some success in increasing the melt strength of polypropylene. For example, EP 190 889 A2 discloses high energy irradiation of polypropylene to create what is believed to be polypropylene having substantial free-end long branches of propylene units. EP 384 431 discloses the use of peroxide decomposition of polypropylene in the substantial absence of oxygen to obtain a similar product.

Traditional Zeigler-Natta type catalysts have been used to copolymerize propylene with α-ω-dienes in order to introduce unsaturation into the polymer. This is described in co-pending U.S. patent application Ser. No. 519,616 wherein a gel-free crystalline polymer is obtained. U.S. Pat. No. 3,351,621 also describes the copolymerization of propylene with α-ω-diene using a Zeigler-Natta catalyst. These Zeigler-Natta catalyzed copolymers do not exhibit properties that are typically associated with polymers thought to have long chain branches. It is believed that this is because the dienes are incorporated through polymerization of only one olefin, with the second olefin remaining in the side chain for further functionalization or in rare cases for complete cross-linking. Melt strength, therefore, is not substantially improved. Thus, there is still a need for propylene polymers having improved melt strength and good processability.

SUMMARY

This invention relates to diene-modified polymers, particularly diene-modified propylene polymers, and to methods for producing such polymers. More specifically, the invention relates to a method for producing diene-modified polymers, said method comprising combining in a reaction zone under suitable reaction conditions, an alpha-olefin monomer having at least 3 carbon atoms, a diene which is preferably an α-ω-diene, and a metallocene catalyst system. Diene modified polymers are also provided wherein the polymer comprises an α-olefin monomer having at least three carbon atoms, from about 0.00005 to about 5 mole percent diene based on the total weight of the polymer and wherein the polymer is essentially gel-free and is prepared using a metallocene catalyst system.

This invention also relates to an irradiated copolymer composition and method for producing the copolymer composition comprising the steps of (1) combining in a reaction zone one or more α-olefin monomers having from three to eight carbon atoms, one or more diene comonomers, and a metallocene catalyst system; and (2) irradiating the resulting copolymer. In this embodiment, the diene is preferably a non α-ω-diene.

Detailed Description

Figure 1:
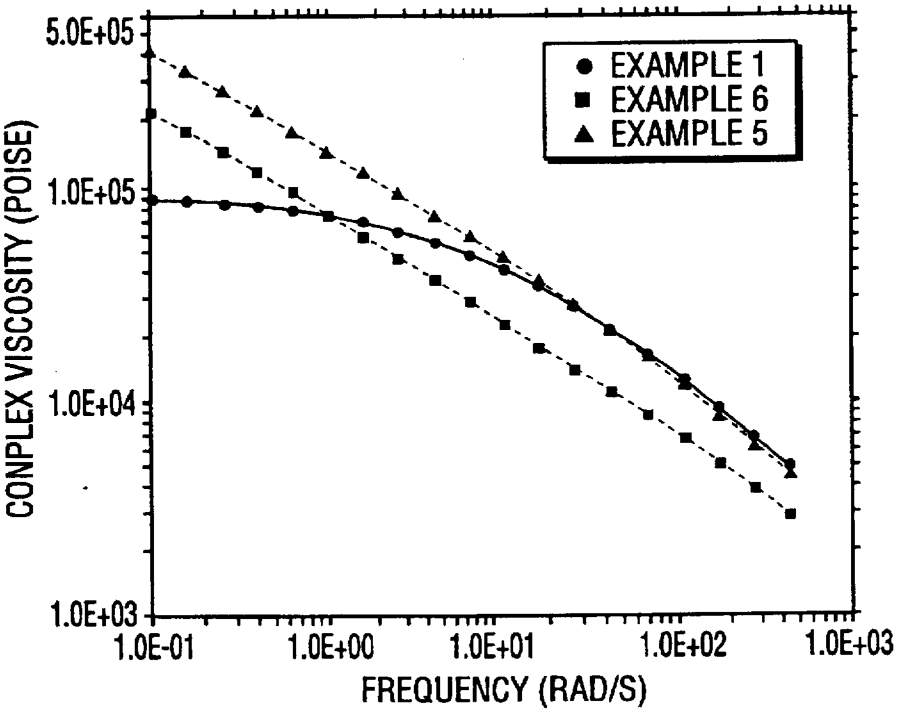
FIG. 1 is a graphic illustration of the relationship between viscosity and frequency (rad/s) and the shear thinning behavior for propylene polymer modified with 0.118 and 0.164 mole percent 1,13-tetradecadiene as compared to homopolypropylene (polymerized at 40° C.).

One method of the invention comprises combining in a reaction zone one or more α-olefin monomers having from two to eight carbon atoms, one or more dienes, and a metallocene catalyst system under suitable polymerization conditions to produce a diene modified polymer.

The α-olefins useful in this method of the invention preferably have from three to eight carbon atoms, more preferably three, four, five and/or six carbon atoms, and most preferably three carbon atoms. These monomers are copolymerized with one or more dienes using a metallocene catalyst system. The dienes may be linear, cyclic, and/or multicyclic including conjugated linear dienes and fused and non-fused cyclic dienes. In one embodiment, the dienes are preferably α-ω-dienes and/or are selected from the group consisting of 1,7-octadiene, 1,9-decadiene, 1,13-tetradecadiene, 1,8-nonadiene, 1,10-undecadiene, 1,11-dodecadiene, 1,15-hexadecadiene, 1,17-octadecadiene and norbornadiene. More preferably the dienes are selected from the group consisting of 1,7-octadiene, 1,9-decadiene, 1,13-tetradecadiene, and norbornadiene. Most preferably, the dienes are selected from the group consisting of 1,9,-decadiene, and 1,13-tetradecadiene.

In another embodiment one or more α-olefins are copolymerized with one or more dienes, preferably non-α-ω-dienes, using a metallocene catalyst system. The resulting copolymer is then irradiated. The alpha olefins preferably have from three to eight carbon atoms, more preferably from three to six carbon atoms, and most preferably three carbon atoms. The dienes may be linear, cyclic, and/or multicyclic including conjugated linear dienes and fused and non-fused cyclic dienes. Preferably the dienes are non α-ω-dienes and are selected from the group consisting of dicyclopentadiene, ethylidenenorbornene, 1,4-hexadiene, vinyl norbornene, and 5-isopropenyl-2-norbornene, more preferably dicyclopentadiene, ethylidenenorbornene, 1,4-hexadiene, and vinyl norbornene, most preferably dicyclopentadiene, ethylidenenorbornene, and 1,4-hexadiene.

The irradiation is preferably carried out using E-beam or gamma irradiation at a dose of about 1 to about 20 Mrad for a few seconds (up to about 30 seconds). Any type of high energy radiation capable of causing the desired chain extension may be used. The polymer may be irradiated in any form such as a powder, granule, pellet, film, molded article, fiber, fabric, etc.

Any metallocene may be used in the present invention. Metallocenes are generally represented by the formula $$Cp_mMR_nX_q$$

wherein Cp is a cyclopentadienyl ring or derivative thereof, M is a Group 4, 5,or 6 transition metal, R is a hydrocarbyl group or hydrocarboxy group having from 1 to 20 carbon atoms, X is a halogen, and m=1–3, n=0–3, q=0–3, and the sum of m+n+q is equal to the oxidation state of the transition metal. The metallocene may be bridged or unbridged, and include heteroatoms in the structure. Examples of metallocenes are discussed in for example, U.S. Pat. Nos. 4,530,914; 4,871,705; 4,937,299; 5,124,418; 5,017,714; 5,120,867; 5,278,119; 5,304,614; 5,324,800; 5,347,025; 5,350,723; 5,391,790; and 5,391,789; EP-A-0 591 756; EP-A-0 520 732; EP-A-0 420 436; WO 91/04257; WO 93/08221; WO 93/08199; and WO 94/01471 each incorporated fully herein by reference. Particularly preferred metallocene components are those that are stereorigid and comprise a Group 4, 5, or 6 transition metal, biscyclopentadienyl derivative, preferably bis-indenyl metallocene components having the following general structure:

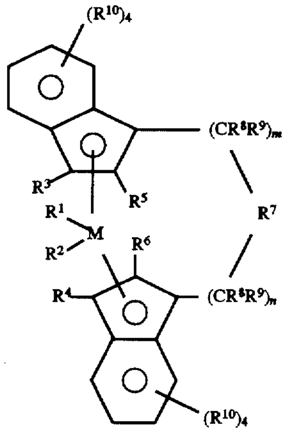

wherein

M is a metal of Group 4, 5, or 6 of the Periodic Table, for example titanium, zirconium, hafnium, vanadium, niobium, tantalum, chromium, molybdenum and tungsten, preferably, zirconium, hafnium and titanium, most preferably zirconium and hafnium;

$R^1$ and $R^2$ are identical or different, are one of a hydrogen atom, a $C_1$–$C_{10}$ alkyl group, preferably a $C_1$–$C_3$ alkyl group, a $C_1$–$C_{10}$ alkoxy group, preferably a $C_1$–$C_3$ alkoxy group, a $C_6$–$C_{10}$ aryl group, preferably a $C_6$–$C_8$ aryl group, a $C_6$–$C_{10}$ aryloxy group, preferably a $C_6$–$C_8$ aryloxy group, a $C_2$–$C_{10}$ alkenyl group, preferably a $C_2$–$C_4$ alkenyl group, a $C_7$–$C_{40}$ arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, or a halogen atom, preferably chlorine;

$R^3$ and $R^4$ are hydrogen atoms;

$R^5$ and $R^6$ are identical or different, preferably identical, are one of a hydrogen atom, halogen atom, preferably a fluorine, chlorine or bromine atom, a $C_1$–$C_{10}$ alkyl group, preferably a $C_1$–$C_4$ alkyl group, which may be halogenated, a $C_6$–$C_{10}$ aryl group, which may be halogenated, preferably a $C_6$–$C_8$ aryl group, a $C_2$–$C_{10}$ alkenyl group, preferably a $C_2$–$C_4$ alkenyl group, a $C_7$–$C_{40}$-arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, a $—NR_2^{15}$, $—SR^{15}$, $—OR^{15}$, $—OSiR_3^{15}$ or $—PR_2^{15}$ radical, wherein $R^{15}$ is one of a halogen atom, preferably a chlorine atom, a $C_1$–$C_{10}$ alkyl group, preferably a $C_1$–$C_3$ alkyl group, or a $C_6$–$C_{10}$ aryl group, preferably a $C_6$–$C_9$ aryl group;

$R^7$ is

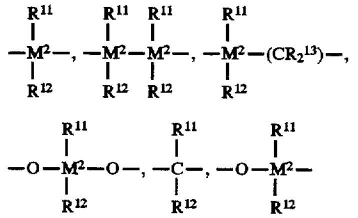

$=BR^{11}$, $=AlR^{11}$, $-Ge-$, $-Sn-$, $-O-$, $-S-$, $=SO$, $=SO_2$, $=NR^{11}$, $=CO$, $PR^{11}$, or $=P(O)R^{11}$;

wherein:

$R^{11}$, $R^{12}$ and $R^{13}$ are identical or different and are a hydrogen atom, a halogen atom, a $C_1$–$C_{20}$ alkyl group, preferably a $C_1$–$C_{10}$ alkyl group, a $C_1$–$C_{20}$ fluoroalkyl group, preferably a $C_1$–$C_{10}$ fluoroalkyl group, a $C_6$–$C_{30}$ aryl group, preferably a $C_6$–$C_{20}$ aryl group, a $C_6$–$C_{30}$ fluoroaryl group, preferably a $C_6$–$C_{20}$ fluoroaryl group, a $C_1$–$C_{20}$ alkoxy group, preferably a $C_1$–$C_{10}$ alkoxy group, a $C_2$–$C_{20}$ alkenyl group, preferably a $C_2$–$C_{10}$ alkenyl group, a $C_7$–$C_{40}$ arylalkyl group, preferably a $C_7$–$C_{20}$ arylalkyl group, a $C_8$–$C_{40}$ arylalkenyl group, preferably a $C_8$–$C_{22}$ arylalkenyl group, a $C_7$–$C_{40}$ alkylaryl group, preferably a $C_7$–$C_{20}$ alkylaryl group or $R^{11}$ and $R^{12}$, or $R^{11}$ and $R^{13}$, together with the atoms binding them, can form ring systems;

$M^2$ is silicon, germanium or tin, preferably silicon or germanium, most preferably silicon;

$R^8$ and $R^9$ are identical or different and have the meanings stated for $R^{11}$;

m and n are identical or different and are zero, 1 or 2, preferably zero or 1, m plus n being zero, 1 or 2, preferably zero or 1; and the radicals $R^{10}$ are identical or different and have the meanings stated for $R^{11}$, $R^{12}$ and $R^{13}$. Two adjacent $R^{10}$ radicals can be joined together to form a ring system, preferably a ring system containing from about 4–6 carbon atoms.

Alkyl refers to straight or branched chain substituents. Halogen (halogenated) is fluorine, chlorine, bromine or iodine atoms, preferably fluorine or chlorine.

Particularly preferred metallocenes are compounds of the structures:

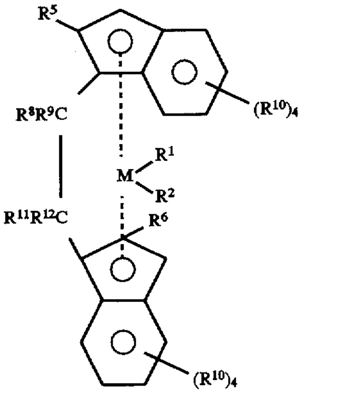

(A)

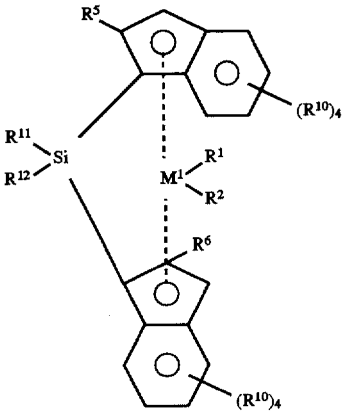

(B)

wherein:

$M^1$ is Zr or Hf, $R^1$ and $R^2$ are methyl or chlorine, and $R^5$, $R^6R^8$, $R^9$, $R^{10}$, $R^{11}$ and $R^{12}$ have the above-mentioned meanings.

The chiral metallocenes may be used as a racemate for the preparation of highly isotactic polypropylene copolymers. It is also possible to use the pure R or S form. An optically active polymer can be prepared with these pure stereoisomeric forms. Preferably the meso form of the metallocene is removed to ensure the center (i.e., the metal atom) provides stereoregular polymerization. Separation of the stereoisomers can be accomplished by known literature techniques. For special products it is also possible to use rac/meso mixtures.

Generally, the metallocenes are prepared by a multi-step process involving repeated deprotonations/metallations of the aromatic ligands and introduction of the bridge and the central atom by their halogen derivatives. The following reaction scheme illustrates this generic approach:

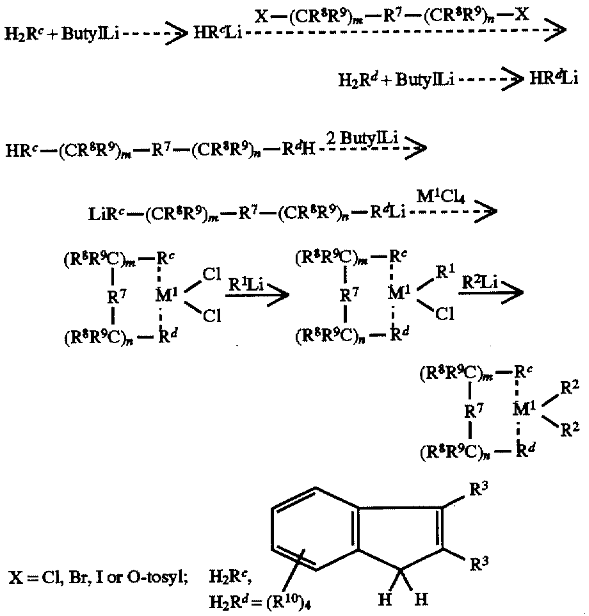

Additional methods for preparing metallocenes of the present invention are fully described in the *Journal of Organometallic Chem.*, volume 288, (1958), pages 63–67, and in EP-A-320762, for preparation of the metallocenes described, both of which are herein fully incorporated by reference.

Illustrative but non-limiting examples of some preferred metallocenes include: Dimethylsilandiylbis (2-methyl-4-phenyl-1-indenyl)$ZrCl_2$Dimethylsilandiylbis(2-methyl-4,5-benzoindenyl)$ZrCl_2$; Dimethylsilandiylbis(2-methyl-4,6-diisopropylindenyl)$ZrCl_2$; Dimethylsilandiylbis(2-ethyl-4-phenyl-1-indenyl)$ZrCl_2$; Dimethylsilandiylbis(2-ethyl-4-naphthyl-1-indenyl)$ZrCl_2$, Phenyl(Methyl)silandiylbis(2-methyl-4-phenyl-1-indenyl)$ZrCl_2$, Dimethylsilandiylbis(2-methyl-4-(1-naphthyl)-1-indenyl)$ZrCl_2$, Dimethylsilandiylbis(2-methyl-4-(2-naphthyl)-1-indenyl) $ZrCl_2$, Dimethylsilandiylbis(2-methyl-indenyl)$ZrCl_2$, Dimethylsilandiylbis(2-methyl-4,5-diisopropyl-1-indenyl) $ZrCl_2$, Dimethylsilandiylbis(2,4,6-trimethyl-1-indenyl) $ZrCl_2$, Phenyl(Methyl)silandiylbis(2-methyl-4,6-diisopropyl-1-indenyl)$ZrCl_2$, 1,2-Ethandiylbis(2-methyl-4,6-diisopropyl-1-indenyl)$ZrCl_2$, 1,2-Butandiylbis(2-methyl-4,6-diisopropyl-1-indenyl)$ZrCl_2$, Dimethylsilandiylbis(2-methyl-4-ethyl-1-indenyl)$ZrCl_2$, Dimethylsilandiylbis(2-methyl-4-isopropyl-1-indenyl)$ZrCl_2$, Dimethylsilandiylbis (2-methyl-4-t-butyl-1-indenyl)$ZrCl_2$, Phenyl(Methyl) silandiylbis(2-methyl-4-isopropyl-1-indenyl)$ZrCl_2$, Dimethylsilandiylbis(2-ethyl-4-methyl-1-indenyl)$ZrCl_2$, Dimethylsilandiylbis(2,4-dimethyl-1-indenyl)$ZrCl_2$, Dimethylsilandiylbis(2-methyl-4-ethyl-1-indenyl)$ZrCl_2$, Dimethylsilandiylbis(2-methyl-α-acenaphth-1-indenyl) $ZrCl_2$, Phenyl(Methyl)silandiylbis(2-methyl-4,5-benzo-1-indenyl)$ZrCl_2$, Phenyl(Methyl)silandiylbis(2-methyl-4,5-(methylbenzo)-1-indenyl)$ZrCl_2$, Phenyl(Methyl)silandiylbis (2-methyl-4,5-(tetramethylbenzo)-1-indenyl)$ZrCl_2$, Phenyl (Methyl)silandiylbis(2-methyl-a-acenaphth-1-indenyl) $ZrCl_2$, 1,2-Ethandiylbis(2-methyl-4,5-benzo-1-indenyl) $ZrCl_2$, 1,2-Butandiylbis(2-methyl-4,5-benzo-1-indenyl) $ZrCl_2$, Dimethylsilandiylbis(2-methyl-4,5-benzo-1-indenyl) $ZrCl_2$, 1,2-Ethandiylbis(2,4,7-trimethyl-1-indenyl)$ZrCl_2$, Dimethylsilandiylbis(2-methyl-1-indenyl)$ZrCl_2$, 1,2-Ethandiylbis(2-methyl-1-indenyl)$ZrCl_2$, Phenyl(Methyl) silandiylbis(2-methyl-1-indenyl)$ZrCl_2$, Diphenylsilandiylbis(2-methyl-1-indenyl)$ZrCl_2$, 1,2-Butandiylbis(2-methyl-1-indenyl)$ZrCl_2$, Dimethylsilandiylbis(2-ethyl-1-indenyl)$ZrCl_2$, Dimethylsilandiylbis(2-methyl-5-isobutyl-1-indenyl)$ZrCl_2$, Phenyl(Methyl)silandiylbis(2-methyl-5-isobutyl-1-indenyl) $ZrCl_2$, Dimethylsilandiylbis(2-methyl-5-t-butyl-1-indenyl) $ZrCl_2$, Dimethylsilandiylbis(2,5,6-trimethyl-1-indenyl) $ZrCl_2$, and the like.

Some preferred metallocene catalyst components are described in detail in U.S. Pat. Nos. 5,149,819, 5,243,001, 5,239,022, 5,296,434 and 5,276,208 all of which are herein fully incorporated by reference.

The terms "cocatalyst" and "activator" are used herein interchangeably and are defined to be any compound or component which can activate a bulky ligand transition metal compound or a metallocene, as defined above. Alumoxane may be used as an activator. There are a variety of methods for preparing alumoxane, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031 and EP-A-0 561 476, EP-B1-0 279 586, EP-A-0 594-218 and WO 94/10180, each of which is fully incorporated herein by reference. It may be preferable to use a visually clear methylalumoxane. A cloudy or gelled alumoxane can be filtered to produce a clear solution or clear alumoxane can be decanted from the cloudy solution.

It is also within the scope of this invention to use ionizing activators, neutral or ionic, or compounds such as tri(n-butyl)ammonium tetrakis(pentaflurophenyl)boron, which ionize the neutral metallocene compound. Such ionizing compounds may contain an active proton, or some other cation associated with but not coordinated or only loosely coordinated to the remaining ion of the ionizing compound. Combinations of activators are also contemplated by the invention, for example, alumoxane and ionizing activators in combinations, see for example, WO 94/07928.

Descriptions of ionic catalysts for coordination polymerization comprised of metallocene cations activated by non-coordinating anions appear in the early work in EP-A-0 277 003, EP-A-0 277 004 and U.S. Pat. No. 5,198,401 and WO-A-92/00333 (incorporated herein by reference). These teach a preferred method of preparation wherein metallocenes (bisCp and monoCp) are protonated by an anion precursor such that an alkyl/hydride group is abstracted from a transition metal to make it both cationic and charge-balanced by the non-coordinating anion.

The term "noncoordinating anion" means an anion which either does not coordinate to said cation or which is only weakly coordinated to said cation thereby remaining sufficiently labile to be displaced by a neutral Lewis base. "Compatible" noncoordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Noncoordinating anions useful in accordance with this invention are those which are compatible, stabilize the metallocene cation in the sense of balancing its ionic charge in a +1 state, yet retain sufficient lability to permit displacement by an ethylenically or acetylenically unsaturated monomer during polymerization.

The use of ionizing ionic compounds not containing an active proton but capable of producing the both the active metallocene cation and an noncoordinating anion is also known. See, EP-A-0 426 637 and EP-A-0 573 403 (incorporated herein by reference). An additional method of making the ionic catalysts uses ionizing anion pre-cursors which are initially neutral Lewis acids but form the cation and anion upon ionizing reaction with the metallocene compounds, for example the use of tris(pentafluorophenyl) boron. See EP-A-0 520 732 (incorporated herein by reference). Ionic catalysts for addition polymerization can also be prepared by oxidation of the metal centers of transition metal compounds by anion pre-cursors containing metallic oxidizing groups along with the anion groups, see EP-A-0 495 375 (incorporated herein by reference).

Where the metal ligands include halogen moieties (for example, bis-cyclopentadienyl zirconium dichloride) which are not capable of ionizing abstraction under standard conditions, they can be converted via known alkylation reactions with organometallic compounds such as lithium or aluminum hydrides or alkyls, alkylalumoxanes, Grignard reagents, etc. See EP-A-0 500 944 and EP-A1-0 570 982 (incorporated herein by reference) for in situ processes describing the reaction of alkyl aluminum compounds with dihalo-substituted metallocene compounds prior to or with the addition of activating anionic compounds.

Methods of supporting ionic catalysts comprising metallocene cations and noncoordinating anions are described in WO91/09882, WO 94/03506 and in co-pending U.S. Ser. No. 08/248,284, filed Aug. 3, 1994 abandoned (incorporated herein by reference). The methods generally comprise either physical adsorption on traditional polymeric or inorganic supports that have been largely dehydrated and dehydroxylated, or using neutral anion precursors that are sufficiently strong Lewis acids to activate retained hydroxy groups in silica containing inorganic oxide supports such that the Lewis acid becomes covalently bound and the hydrogen of the hydroxy group is available to protonate the metallocene compounds.

The polymerization method of this invention can be a solution, slurry or bulk phase process. Further, gas phase processes can be used as long as a support, if used, is chosen that will not significantly interfere with the polymerization of the pendant unsaturation site. In a solution process, toluene, heptane, octane, pentane and hexane are suitable solvents, however any hydrocarbon or solvent will work in the practice of this invention.

The catalyst system may be introduced into the reaction zone as independent components in a solvent or diluent or as the combined product in a solvent or a diluent. Likewise, the monomers, in bulk or in solvent or diluent can be introduced into the reaction zone as a separate feed, or may be combined with one or the other of the catalyst system components. Furthermore, the catalyst components can be suspended or dissolved in the monomers themselves and thereafter fed into the reaction zone.

The various reactors operate in standard conditions for solution, slurry, bulk or gas phase reactors known to those of ordinary skill in the art. For example, a transition metal compound such as bis-cyclopentadienyl zirconium dichloride combined with methylalumoxane may be suspended in toluene and a quantity of propylene with α, ω-diene(s) is suspended in a second quantity of toluene, then the two toluene compositions are charged into a reactor and allowed to react for about 1 minute to about 10 hours at a temperature of about 0° to about 250° C. and at a pressure of about 1 to about 15 psi (about 7 to about 104 MPa) to produce a diene modified polymer.

Process conditions may affect the level of comonomer concentration and the ability to obtain a gel-free product. Solution polymerization conditions as opposed to bulk polymerization, appear to enhance the production of gel-free product.

A two stage polymerization process may be used in order to increase melt flow rate and broaden molecular weight distribution. This process involves a first stage wherein high molecular weight (greater than 200,000 weight average molecular weight) diene modified polymer is produced without hydrogen and a second stage wherein hydrogen is introduced into the reactor to produce a lower molecular weight fraction. The concentration of hydrogen used in the second stage will depend upon the type of polymer made and the melt flow rate desired.

Scavengers and other additives may be used in the polymerization process of this invention. Scavengers include such compounds as triethylaluminum (TEAL), trimethylaluminum (TMAL), tri-isobutylaluminum (TIBAL), tri-n-hexylaluminim (TNHAL), and diethyl aluminum chloride (DEAC) and the like.

The diene modified polymers of the invention may contain anywhere from 0.00003 to 5.00 mole percent α-ω-diene, preferably from about 0.00005 to about 1 mole percent α-ω-diene, even more preferably from about 0.0005 to about 0.5 mole percent α-ω-diene, even more preferably from about 0.0005 to about 0.2 mole percent α-ω-diene, and most preferably from about 0.005 to about 0.15 mole % α-ω-diene.

To be of practical value, the molecular weight of the diene-modified polymer should be in the range of from about 50,000 to about 700,000, preferably from about 100,000 to about 600,000, even more preferably from about 300,000 to about 550,000 weight average molecular weight. (Unless otherwise specified, all references to molecular weight are weight average molecular weight.) Preferably the melt flow rate of the polymer is in the range of from about 0.03 dg/min to about 100 dg/min, more preferably from about 0.05 dg/min to about 50 dg/min.

It may be necessary to use a chain transfer agent such as hydrogen to control the melt flow rate and/or molecular weight of the final polymer product. For instance, if the catalyst system selected tends to produce polymer having a molecular weight that is above about 800,000, then the use of hydrogen to control molecular weight will facilitate diene incorporation such that a gel-free product may be obtained.

As used herein, "essentially gel-free" means that, (1) using the rheological test, considering the cross-over of G' (storage modulus) and G" (loss modulus) in the test frequency range, if the G' is always above G" the polymer is assumed to be in an elastic network structure containing gels; or (2) during the MFR test, the polymer does not remain powdery (melts) or when the polymer extrudate comes out of the capillary, the polymer does not exhibit extensive swelling; or (3) during the preparation of compression molded films, no gels are visible. Thus for the polymers of this invention there is a cross-over of G' and G"; the MFR can be determined without extensive swelling and the polymer completely melts; and no gels are observed when the polymer is used to make molded films.

Metallocene catalyzed homopolymer typically has a molecular weight distribution (Mw/Mn) of from about 2.1 to about 2.5. The diene modified polymer of this invention may have a molecular weight distribution of from about 2.1 to about 30, preferably from about 2.1 to about 20, even more preferably from about 2.1 to about 15. In contrast, Zeigler-Natta catalyzed ethylene/diene or propylene/diene copolymers typically have a molecular weight distribution in the range of from 4.0 to 7.5 compared to Zeigler-Natta catalyzed homopolymer which typically has a molecular weight distribution of from 2.5 to 5.0. Thus the change in molecular weight distribution upon diene modification seen in the diene modified polymers of this invention as compared to their homopolymer counterparts prepared using the same catalyst is significantly greater than the change in molecular weight distribution as seen in Zeigler-Natta catalyzed polymers upon diene modification.

One of the most significant properties of the diene-modified polymers of this invention is their complex viscosity vs. frequency and shear thinning behavior. The α-ω-diene modified polymers show enhanced shear thinning, i.e., a much sharper decrease in viscosity as frequency is increased as compared to homopolymer produced using either a metallocene catalyst system or a Zeigler-Natta catalyst. Thus, the α-ω-diene modified polymers of this invention have superior processing characteristics.

The magnitude of viscosity at low shear rate such as 0.1 rad/s is an indication of melt strength. Higher viscosity at low shear rate indicates higher melt strength. The diene modified polymers of the present invention exhibit a viscosity that is significantly higher at low shear rate or frequency as compared to homopolymer. Thus, the diene modified polymers of the present invention are not only easier to process but have higher melt strength as compared to a propylene homopolymer.

Alternatively, α-olefin polymers, particularly polypropylene, may be modified with a diene, preferably a non-α-ω-diene, and then irradiated to cause chain extension. We have found that when metallocene catalyzed diene modified propylene copolymer is exposed to irradiation such as E-beam irradiation, there is an increase in molecular weight and broadening of molecular weight distribution. This increase in molecular weight is the result of chain extension through the residual side-chain unsaturation of the diene unit.

One would expect either degradation of the copolymer and/or crosslinking upon irradiation, however, we have found that when certain metallocene catalyzed diene modified propylene copolymers of the present invention are irradiated, the resulting compositions are essentially gel-free as shown by their high solubility in refluxing xylene.

The diene modified propylene copolymers which are subjected to irradiation may contain up to 20 mole percent diene, preferably less than 15 mole percent, most preferably less than 10 mole percent diene. The molecular weight distribution will typically range from about 2.5 to about 10.0 depending on the amount of irradiation, amount of diene and type of diene.

Preferably there is at least a 15% increase in molecular weight upon irradiation, even more preferably at least a 20% increase, even more preferably at least a 50% or more increase in molecular weight upon irradiation. Likewise, there is preferably at least a 15% increase in the molecular weight distribution of the polymer, more preferably at least a 50% increase, even more preferably at least a 100% increase and even more preferably at least a 200% increase in molecular weight distrubution upon irradiation of the diene modified polymer.

EXAMPLES 1,13-tetradecadiene (TDD), 1,9-decadiene, 1,7-octadiene (OD) and norbornadiene were used to modify propylene in a series of polymerization reactions using different amounts of diene. Two different catalyst systems were used. In the first series of polymerizations, propylene was modified with 1,13-tetradecadiene, 1,9-decadiene, 1,7-octadiene and norbornadiene using the metallocene dimethysilylbis(indenyl) hafnium dimethyl ionically activated with (N, N-dimethylanilinium perfluorotetraphenyl boron). In the second series of polymerizations, propylene was modified with 1,13 tetradecadiene and 1,7-octadiene using the metallocene di-tetrahydropyrrolesilanediyl (bis-2-methylindenyl)zirconium dichloride $[(C_4H_8N)_2Si(2\text{-methylindenyl})ZrCl_2]$ activated with methylalumoxane. The physical properties of the diene modified polymers were characterized and are discussed below.

Melt flow rate (MFR) and and molecular weight distribution (MWD) were measured using the cross-over modulus and frequency developed by Zeichner and Patel (Proceedings 2nd World Congress of Chemical Engineering, Montreal, Quebec, Canada, Oct. 4–9 (1981). MFRs were also measured using ASTM D-1238 at 230° C. and 2.16 kg load. The mechanical properties (modulus, tensile strength, elongation at break) were measured using ASTM D-1708 microtensile testing procedure. The rheological properties (G', G", an complex viscosity) were determined on a Rheometrics Dynamic Spectrometer II, at 180° C. using cone and plate configuration and compression molded samples.

Di-tetrahydropyrrolesilanediyl (bis-2-methylindenyl) zirconium dichloride is prepared by the method disclosed in U.S. patent application Ser. No. 08/112,491, filed Aug., 26, 1993 Pat. No. 5,486,585 (fully incorporated herein by reference).

Percent gel formation is determined by the Soxhlet extraction technique which generally is as follows. Approximately 0.5 gm of sample is placed in a dry cellulose microthimble. The thimble is stapled carefully so that the sample does not escape during the extraction. The weight of the thimble loaded with the sample is recorded (x) and the thimble is placed in a soxlet extractor where it is immersed in hot xylene at near boiling temperature for 48 hours. The thimble is then removed and dried thoroughly under vacuum until it reaches constant weight (y). The percent gel is equal to y/x.100%.

Examples 1–15

The polymerizations were carried out as follows. A 1-liter autoclave reactor was charged with 0.5 ml 1 molar triethyl aluminum (TEAL) as a scavenger, followed by 1,13-tetradecadiene in 2 ml of toluene, 300 ml of toluene, and 150 ml of propylene. The temperature of the reactor was equilibrated at the desired temperature and 3 mg of dimethylsilanyl bis(indenyl) hafnium di-methyl and 5 mg of(N,N-dimethylanalynium perflurotetraphenyl boron) dissolved together in toluene (1 ml) was injected into the reactor. The polymerization was allowed to run for 30 minutes then the reactor was vented to stop the reaction. The recovered solid polymer was precipitated into methanol, filtered and dried. The data and conditions for the polymerization runs are shown in Table 1. The physical properties of the resulting diene modified polymers are shown in Table 2.

TABLE 1

| Example | Propylene/ Comonomer (ml) | Comonomer (mole %) | Temperature (°C.) |
|---|---|---|---|
| 1 | 150/— | 0 | 40 |
| 2 | 150/0.05 | 1.8E-2 | 40 |
| 3 | 150/0.2 | 4.7E-2 | 40 |
| 4 | 150/0.4 | 9.4E-2 | 40 |
| 5 | 150/0.5 | 1.18E-1 | 40 |
| 6 | 150/0.7 | 1.64E-1 | 40 |
| 7 | 150/— | 0 | 60 |
| 8 | 150/0.2 | 4.7E-2 | 60 |
| 9 | 150/0.4 | 9.4E-2 | 60 |
| 10 | 150/0.6 | 1.41E-1 | 60 |
| 11 | 150/0.7 | 1.64E-1 | 60 |
| 12 | 150/0.9 | 1.64E-1 | '60* |
| 13 | 150/0.48[a] | 1.41E-1 | 40 |
| 14 | 150/0.39[b] | 1.41E-1 | 40 |
| 15 | 150/0.28[c] | 1.41E-1 | 40 |

*Polymer was cross-linked.
[a]1,9-decadiene
[b]1,7-octadiene
[c]norbornadiene

TABLE 2

| Example | Comonomer (mole %) | MFR (dg/min) | $M_w/M_n$ | Modulus (psi/MPa) | Tensile Strength (psi/MPa) | Elongation at Break (%) |
|---|---|---|---|---|---|---|
| 1 | 0 | 1.76 | 2.44 | 66,020/455 | 5,323/36 | 747 |
| 2 | 1.18E-2 | 1.25 | 2.33 | 65,270/456 | 5,565/38 | 749 |
| 3 | 4.7E-2 | 3.0 | 2.74 | 79,470/547 | 6,699/46 | 787 |
| 4 | 9.4E-2 | 2.48 | 2.93 | 65,760/453 | 5,445/37 | 755 |
| 5 | 1.18E-1 | 0.7 | 4.4 | 59,130/407 | 5,480/37 | 727 |
| 6 | 1.64E-1 | 2.13 | 17.0 | 72,990/503 | 6,116/42 | 725 |
| 7 | 0 | 8.47 | 2.34 | 63,430/437 | 5,557/38 | 779 |
| 8 | 4.7E-2 | 3.94 | 2.85 | | | |
| 9 | 9.4E-2 | 0.32 | | 64,430/444 | 4,798 | 654 |
| 10 | 1.41E-1 | 1.0 | 6.42 | | | |
| 11 | 1.64E-1 | 2.86 | 8.5 | 66,120/455 | 5,744/39 | 768 |
| 13 | 1.41E-1 | 0.91 | 6.06 | | | |
| 14 | 1.41E-1 | 1.85 | 2.35 | | | |
| 15 | 1.41E-1 | 2.01 | 2.78 | | | |
| 16* | | 2.1 | | 54,800/377 | 6,272/43 | 841 |

*Escorene Polypropylene PD-9122

Examples 17–23

Polymerizations were carried out as follows. A 2-liter autoclave reactor was charged with 0.5 ml of 1 molar triethyl aluminum (TEAL), followed by the comonomer indicated in Table 3 in 1 ml of toluene, and 500 ml propylene. The temperature of the reactor was equillibrated at 50° C. and was charged with 0.0045 mmol/l of di-tetrahydropyrrolesilanediyl (bis-2-methylindenyl) zirconium dichloride and 0.0129 mol/l of MAO. The polymerization was continued for 10 min. after which the reactor was vented to terminate the reaction. The copolymer recovered from the reactor was washed with methanol, filtered, and dried. The results are reported in Table 3.

TABLE 3

| Example | Comonomer/ Mole % | $T_m$ (°C.) | $M_w$ | $M_w/M_n$ |
|---|---|---|---|---|
| 17 | OD/0 | 150.1 | 600,000 | 2.0 |
| 18 | OD/0.0079 | 149.1 | 670,000 | 2.6 |
| 19 | OD/0.015 | 149.6 | 780,000 | 2.8 |
| 20 | OD/0.032 | 148.3 | 760,000 | 4.14 |
| 21 | TDD/0.0047 | 149.6 | 930,000 | 2.7 |
| 22 | TDD/0.0094 | 150.4 | | |
| 23 | TDD/0.023 | 149.6 | | |

Comparative Examples 24–27

Propylene was copolymerized with varying amounts of 1,13-tetradecadiene using the Zeigler Natta catalyst system TOHO-THC-131-2, a magnesium supported Zeigler-Natta catalyst commercially available from Toho Titanium Company, Limited (Japan). Polymerizations were carried out as follows. A typical polymerization consisted of adding to a 2 liter zipperclave reactor, 1000 ml. of propylene, a premixed solution containing 2 ml. of 1M triethylaluminum in heptane and 2 ml. of 0.1M methylcyclohexyldimethyoxysilane in heptane, the indicated amount of 1,13-tetradecadiene and 70 mmol. of hydrogen. A catalyst solution, approximately 50 mg. of a 15 wt % mineral oil solution, was then injected into the reactor via 250 ml. of high pressure propylene. The reactor temperature was raised to 70° C. within about a minute period. The reaction was limited to 1 hour. Results are reported in Table 4.

TABLE 4

| Example | TDD (mls) | MFR | MWD |
|---|---|---|---|
| 24 | 0.0 | 6.82 | 4.89 |
| 25 | 0.1 | 6.58 | 5.06 |
| 26 | 0.2 | 5.51 | 4.82 |
| 27 | 0.3 | 5.68 | 4.80 |

As can be seen from this data, incorporation of 1,13-tetradecadiene using a Zeigler Natta catalyst system does not significantly affect the molecular weight distribution of the polymer. The absence of shear thinning behavior is evident in FIG. 6.

The relationship between viscosity and frequency for some of the diene modified polymers are shown in FIGS. 1–7. Figure one illustrates this feature of the diene modified propylene of Examples 5 and 6 as compared to Example 1 which is the non-modified homopolypropylene. As can be seen in this figure, the melt viscosity for the inventive polymer at the frequency of 0.1 rad/s is significantly higher in comparison to Example 1. In addition, invention Examples 5 and 6 have enhanced shear thinning behavior as compared to homopolypropylene.

Figure 2:
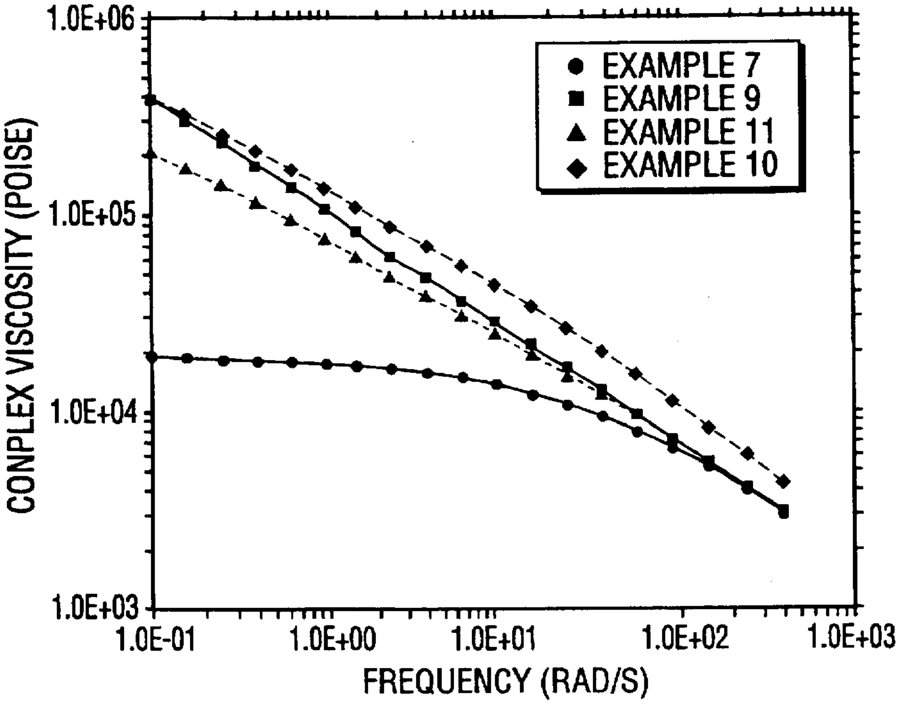
FIG. 2 is a graphic illustration of the relationship between viscosity and frequency (rad/s) and the shear thinning behavior for propylene polymer modified with 0.0094, 0.141 and 0.164 mole percent 1,13-tetradecadiene as compared to propylene homopolymer (polymerized at 60° C.).

FIG. 2, demonstrates the relationship between viscosity and frequency for the diene modified polymers of Examples 9, 10, and 11 as compared to the homopolypropylene of Example 7. The viscosity at a frequency of 0.1 rad/s for Example 7 (non-diene modified) is significantly lower than Example 1 (shown in FIG. 1). This is due to the higher MFR of Example 7 as compared to Example 1 (8.47 dg/min as compared to 1.76 dg/min). At a frequency of 0.01 rad/s, the diene modified polymers of Examples 9, 10 and 11 show a significantly better melt viscosity in comparison to Example 7. More importantly, the shear thinning behavior of the diene modified polymers is much better in comparison to the homopolymer of Example 7.

Figure 3:
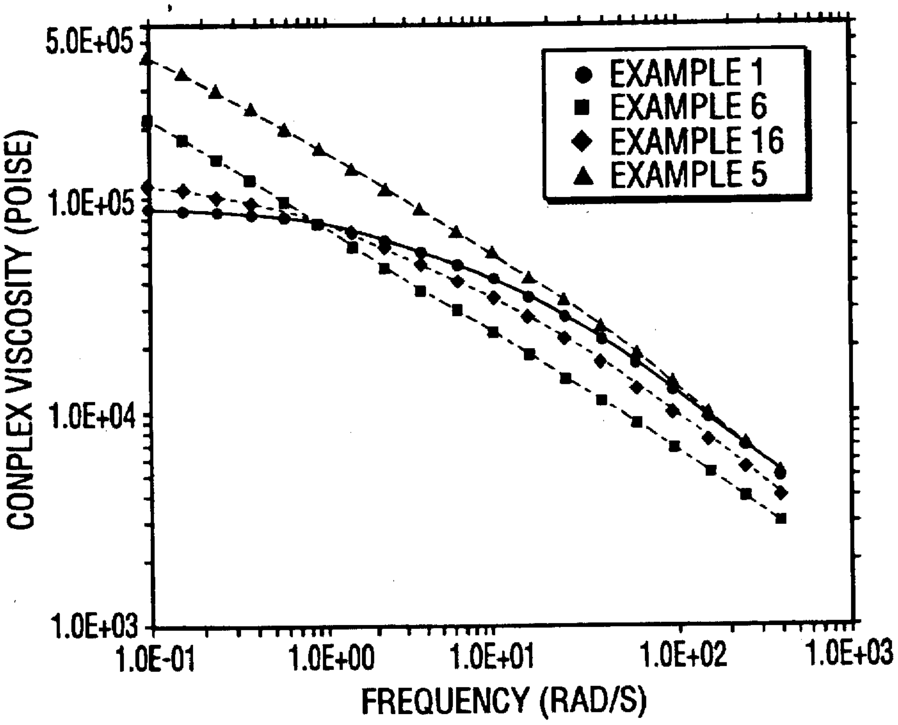
FIG. 3 is a graphic illustration of the relationship between viscosity and frequency (rad/s) and the shear thinning behavior for propylene polymer modified with 0.118 and 0.164 mole percent 1,13-tetradecadiene as compared to homopolypropylene (polymerized at 40° C.).

FIG. 3 demonstrates the relationship between viscosity and frequency for the diene modified polymers of Examples 5 and 6 as compared to a commercially available polypropylene (Example 16) which has a MFR of 2.1 dg/min and is used commercially for thermoforming applications requiring high melt strength. The diene modified polymers of Examples 5 and 6 show a significantly higher melt viscosity at a frequency of 0.1 rad/s and more importantly, superior shear thinning behavior.

Figure 4:
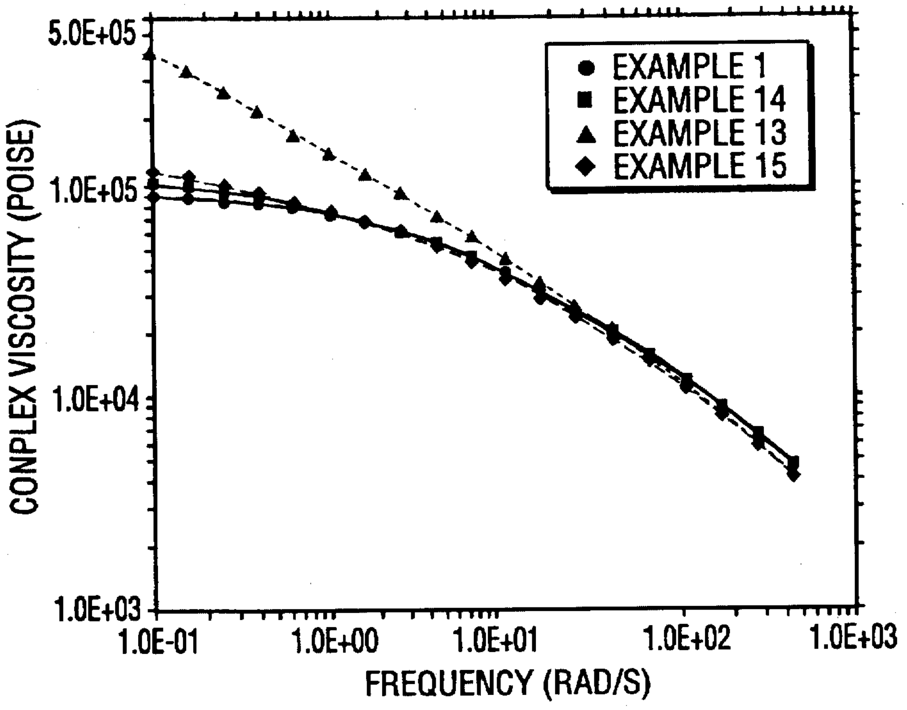
FIG. 4 is a graphic illustration of the relationship between viscosity and frequency (rad/s) and the shear thinning behavior for propylene polymer modified with 0.141 mole percent 1,9-decadiene, 1,7-octadiene, and norbornadiene as compared to propylene homopolymer (polymerized at 40° C.).

FIG. 4 demonstrates the relationship between viscosity and frequency for the diene modified polymers of Examples 13, 14, and 15 as compared to the homopolymer of Example 1. Examples 13 and 14, which are modified with 1,7-octadiene and norbornadiene respectively, show a small improvement in melt strength and shear thinning behavior as compared to Example 1. Example 13, which is modified with 1,9-decadiene shows significant enhancement in both melt strength and shear thinning behavior as compared to the homopolymer of Example 1.

Figure 5:
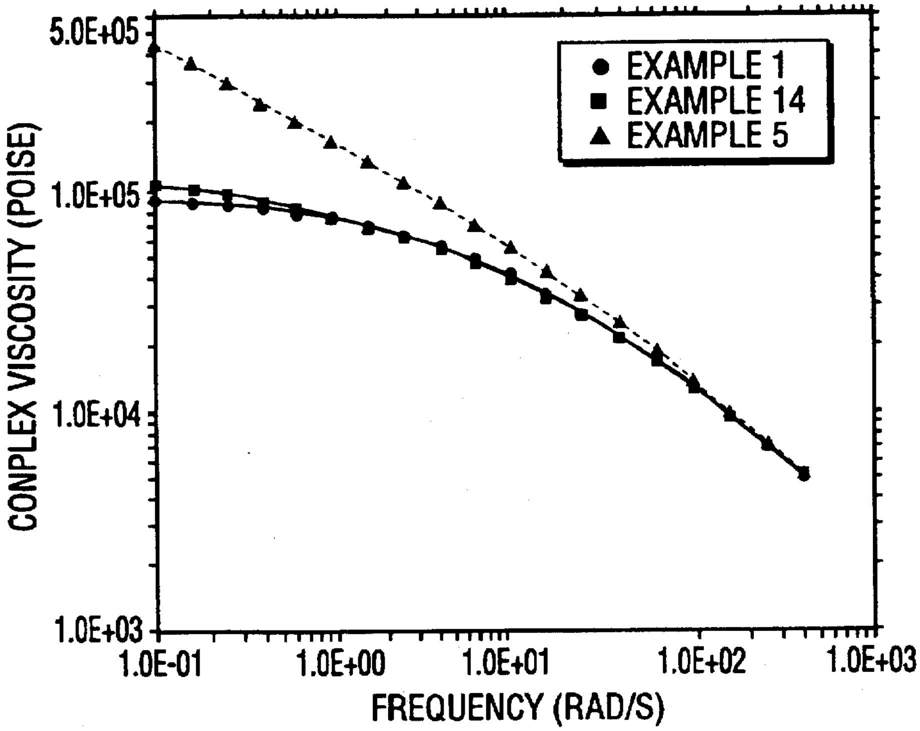
FIG. 5 is a graphic illustration of the relationship between viscosity and frequency (rad/s) and shear thinning behavior for propylene polymer modified with 1,7-octadiene (0.141 mole %) and a propylene polymer modified with 1,13-tetradecadiene (0.118 Mole %) as compared to propylene homopolymer.

FIG. 5 demonstrates the relationship between viscosity and frequency for the diene modified polymers of Example 14 and 5 as compared to the homopolymer of Example 1. The polymer modified with 1,13-tetradecadiene (Example 5) has much improved shear thinning characteristics and melt strength. The polymer modified with 1,7-octadiene (Example 14) shows slight improvement.

Figure 6:
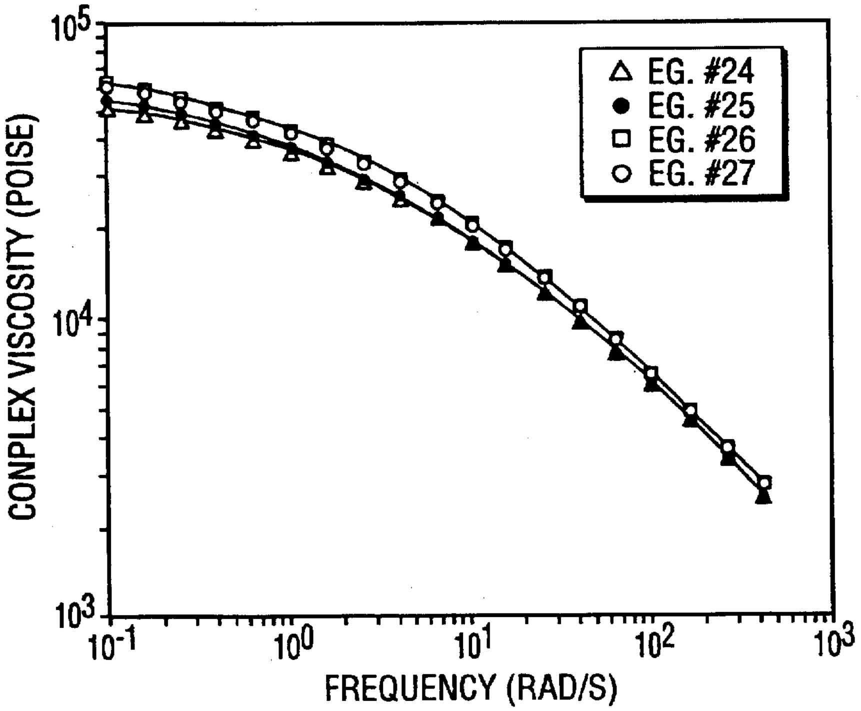
FIG. 6 is a graphic illustration of the relationship between viscosity and frequency (rad/s) and shear thinning behavior for propylene polymer modified with 1,13-tetradecadiene using a traditional Zeigler Natta catalyst system.

FIG. 6 demonstrates the relationship between viscosity and frequency for the diene modified polymers of comparative examples 24–29 which were prepared usng the Zeigler Natta catalyst TOHO-THC-131-2 (obtained from Toho Titanium Company, Limited. It is evident from this figure that shear thinning behavior is not improved.

Figure 7:
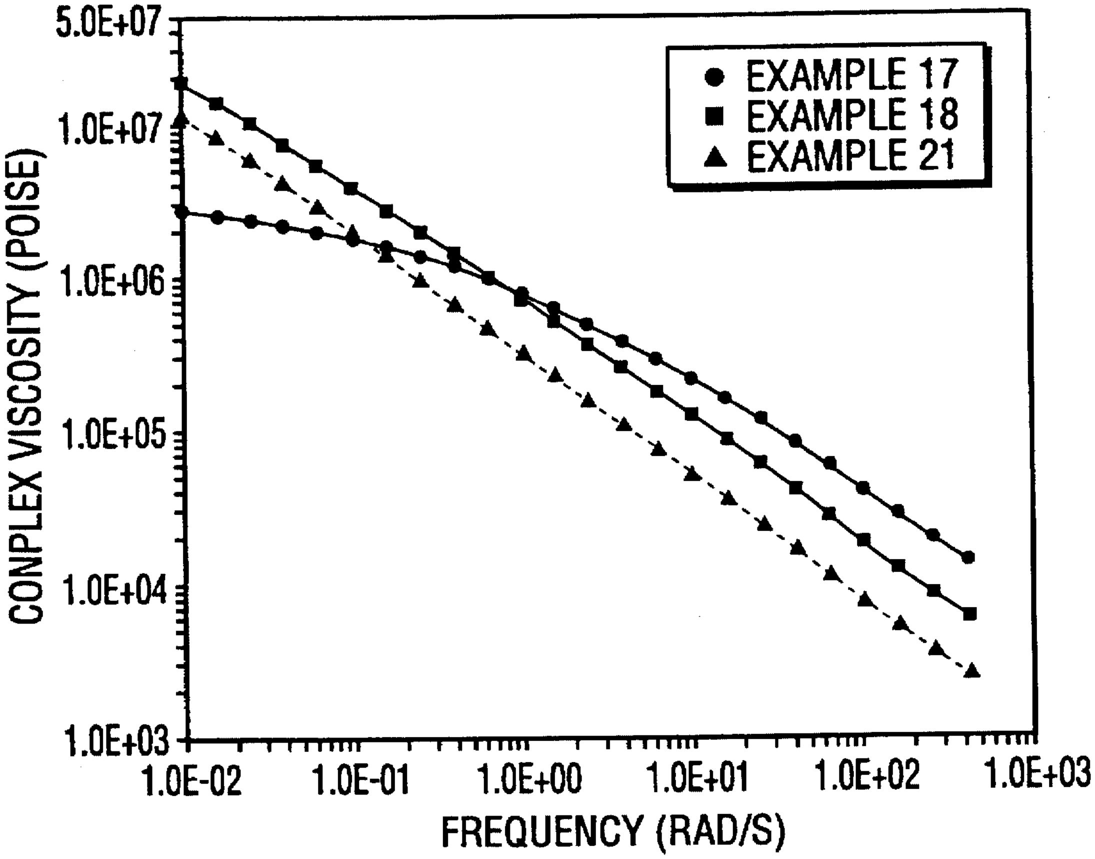
FIG. 7 is a graphic illustration of the relationship between viscosity and frequency (rad/s) and shear thinning behavior for propylene polymer modified with 1,7-octadiene (0.0079 mole %) and propylene polymer modified with 1,13-tetradecadiene (0.0047 mole %) as compared to homopolymer.

FIG. 7 shows the relationship between viscosity and frequency for the diene modified polymers of Examples 18 (modified with 1,7-octadiene) and 21 (modified with (1,13-tetradecadiene) as compared to control Example 17 (homopolymer). As is evident, the diene modified polymers of Examples 18 and 21 have improved shear thinning behavior and melt strength.

Examples 28–33

Propylene was copolymerized with dicyclopentadiene and the resulting copolymer was compression molded into films which were then subjected to varying amounts of E-beam irradiation. The copolymer weight average molecular weight, molecular weight distribution and % gel were then determined. The results are reported in Table 5.

The polymerization procedure was as follows. A 1 L autoclave reactor was charged with 500 ml. of propylene, 12.5 dicyclopentadiene and 1.0 ml. of 30% MAO solution in toluene. In a seperate vial, 10 mg of dimethylsilanyl bis (indenyl) hafnium di-methyl was mixed with 4.0 ml of MAO in toluene (30%). The reactor temperature was maintained at 60° C. The catalyst was charged into the reactor using a high pressure catalyst tube and polymerization was continued for 2 hours. The recovered polymer was extracted with a large excess of acetone for at least 24 hours to eliminate non reacted dicyclopentadiene. After extraction, the polymer was dried under vacuum at 60° C.

The polymer was then compression molded into films which were subjected to E-beam irradiation at the various levels indicated in Table 5. The irradiated films were characterized by the soxlet extraction technique described above to determine gel content. The results are reported in Table 5.

TABLE 5

| Example | E-Beam Dose (Mrad) | $M_w$ | $M_w/M_n$ | % Gel |
|---|---|---|---|---|
| 28 | 0 | 50,000 | 2.79 | 4.6 |
| 29 | 1 | 50,500 | 3.03 | 2.7 |
| 31 | 3 | 56,730 | 3.46 | 1.0 |
| 32 | 5 | 61,600 | 3.94 | 1.0 |
| 33 | 10 | 85,290 | 6.95 | 1.4 |

The foregoing description is intended to exemplify preferred embodiments of the invention. The invention includes other embodiments not necessarily within the scope of any express example or embodiment recited above. The invention, therefore, is limited only as set forth in the appended claims.

We claim:

1. A method for producing diene-modified isotactic propylene polymer, said method comprising combining in a reaction zone under suitable polymerization conditions propylene, one or more α-ω-dienes, and a metallocene catalyst system.

2. The method of claim 1 wherein the diene is selected from the group consisting of 1,7-octadiene, 1,9-decadiene, 1,13-tetradecadiene, 1,8-nonadiene, 1,10-undecadiene, 1,11-dodecadiene, 1,15-hexadecadiene, and 1,17-octadecadiene.

3. The method of claim 1 wherein the metallocene catalyst system comprises a metallocene represented by the formula:

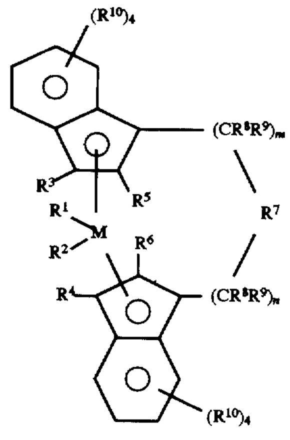

wherein

M is selected from the group consisting of titanium, zirconium, hafnium, vanadium, niobium, tantalum, chromium, molybdenum and tungsten;

$R^1$ and $R^2$ are identical or different, are one of a hydrogen atom, a $C_1$–$C_{10}$ alkyl group, a $C_1$–$C_{10}$ alkoxy group, a $C_6$–$C_{10}$ aryl group, a $C_6$–$C_{10}$ aryloxy group, a $C_2$–$C_{10}$ alkenyl group, a $C_2$–$C_4$ alkenyl group, a $C_7$–$C_{40}$ arylalkyl group, A $C_7$–$C_{40}$ alkylaryl group, a $C_8$–$C_{40}$ arylalkenyl group, or a halogen atom;

$R^3$ and $R^4$ are hydrogen atoms;

$R^5$ and $R^6$ are identical or different, and are one of a halogen atom, a $C_1$–$C_{10}$ alkyl group which may be halogenated, a $C_6$–$C_{10}$ aryl group which may be halogenated, a $C_2$–$C_{10}$ alkenyl group, a $C_7$–$C_{40}$-arylalkyl group, a $C_7$–$C_{40}$ alkylaryl group, a $C_8$–$C_{40}$ arylalkenyl group, a $—NR_2^{15}$, $—SR^{15}$, $—OR^{15}$, $—OSiR_3^{15}$ or $—PR_2^{15}$ radical, wherein $R^{15}$ is one of a halogen atom, a $C_1$–$C_{10}$ alkyl group, or a $C_6$–$C_{10}$ aryl group;

$R^7$ is

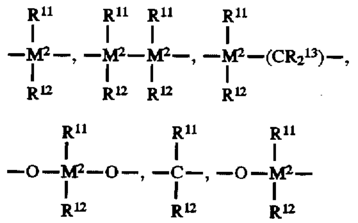

$=BR^{11}$, $=AlR^{11}$, $-Ge-$, $-Sn-$, $-O-$, $-S-$, $=SO$, $=SO_2$, $=NR^{11}$, $=CO$, $PR^{11}$, or $=P(O)R^{11}$;

wherein:

$R^{11}$, $R^{12}$ and $R^{13}$ are identical or different and are a hydrogen atom, a halogen atom, a $C_1$–$C_{20}$ alkyl group, a $C_1$–$C_{20}$ fluoroalkyl group, a $C_6$–$C_{30}$ aryl group, a $C_6$–$C_{30}$ fluoroaryl group, a $C_1$–$C_{20}$ alkoxy group, a $C_2$–$C_{20}$ alkenyl group, a $C_7$–$C_{40}$ arylalkyl group, a $C_8$–$C_{40}$ arylalkenyl group, a $C_7$–$C_{40}$ alkylaryl group, or $R^{11}$ and $R^{12}$, or $R^{11}$ and $R^{13}$, together with atoms binding them, can form ring systems;

$M^2$ is silicon, germanium or tin;

$R^8$ and $R^9$ are identical or different and have the meanings stated for $R^{11}$;

m and n are identical or different and are zero, 1 or 2, m plus n being zero, 1 or 2; and the radicals $R^{10}$ are identical or different and have the meanings stated for $R^{11}$, $R^{12}$ and $R^{13}$ and two adjacent $R^{10}$ radicals can be joined together to form a ring system.

4. The method of claim 1 wherein the diene is selected from the group consisting of 1,13-tetradecadiene, 1,9-decadiene and 1,7-octadiene.

5. A diene modified polymer produced by the method of claim 1.

6. A diene modified isotactic propylene polymer comprising propylene units, from about 0.00005 to about 5 mole percent α-ω-diene units and wherein the polymer is essentially gel-free and is prepared using a metallocene catalyst system.

7. The polymer of claim 6 wherein the diene is present at a concentration in the range of from about 0.01 to 0.2 percent.

8. The polymer of claim 6 wherein the diene is present at a concentration in the range of from about 0.0005 to about 0.02 mole percent.

9. The polymer of claim 6 wherein the polymer has a viscosity that is higher at 0.1 rad/s as compared to homopolymer that is not modified with diene when the homopolymer is otherwise prepared under the same conditions.

10. The polymer of claim 6 wherein the diene is selected from the group consisting of 1,7-octadiene, 1,9-decadiene, 1,13-tetradecadiene, 1,8-nonadiene, 1,10-undecadiene, 1,11-dodecadiene, 1,15-hexadecadiene, and 1,17-octadecadiene.

11. The polymer of claim 6 wherein the diene is selected from the group consisting of 1,13-tetradecadiene, 1,9-decadiene and 1,7-octadiene.

12. A method for producing diene-modified polymer, said method comprising the steps of: (1) combining in a reaction zone under suitable polymerization conditions one or more alpha-olefin monomers having from 3 to 8 carbon atoms, one or more dienes, and a metallocene catalyst system; and (2) irradiating the resulting copolymer.

13. The method of claim 12 wherein the diene is selected from the group consisting of dicyclopentadiene, ethylidenenorbornene, 1,4-hexadiene, vinyl norbornene, and 5-isopropenyl-2-norbornene.

14. The method of claim 12 wherein the diene is selected from the group consisting of dicyclopentadiene, ethylidenenorbornene and 5-isopropenyl-2-norbornene.

15. The method of claim 12 wherein the diene is a non α-ω-diene.

16. The method of claim 12 further comprising the step of forming the copolymer into a film.

17. The method of claim 12 wherein the irradiation is up to 20 Mrad of E-beam irradiation.

18. The method of claim 12 wherein the α-olefin is propylene.

19. The polymer produced by the method of claim 12.

20. The polymer produced by the method of claim 17.

21. A diene modified polymer produced by the method of claim 3.

22. The polymer of claim 6 wherein the metallocene catalyst system comprises a metallocene represented by the formula:

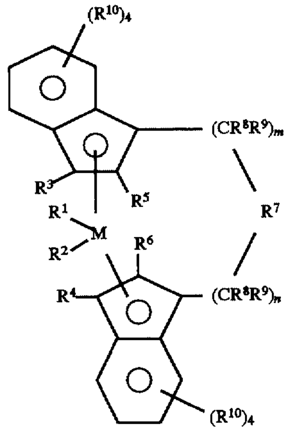

wherein

M is selected from the group consisting of titanium, zirconium, hafnium, vanadium niobium, tantalum, chromium, molybdenum and tungsten;

$R^1$ and $R^2$ are identical or different, are one of a hydrogen atom, a $C_1$–$C_{10}$ alkyl group, preferably a $C_1$–$C_3$ alkyl group, a $C_1$–$C_{10}$ alkoxy group, a $C_6$–$C_{10}$ aryl group, a $C_6$–$C_{10}$ aryloxy group, a $C_2$–$C_{10}$ alkenyl group, a $C_2$–$C_4$ alkenyl group, a $C_7$–$C_{40}$ arylalkyl group, a $C_7$–$C_{40}$ alkylaryl group, a $C_8$–$C_{40}$ arylalkenyl group, or a halogen atom;

$R^3$ and $R^4$ are hydrogen atoms;

$R^5$ and $R^6$ are identical or different, and are one of a halogen atom, a $C_1$–$C_{10}$ alkyl group which may be halogenated, a $C_6$–$C_{10}$ aryl group which may be halogenated, a $C_2$–$C_{10}$ alkenyl group, a $C_7$–$C_{40}$-arylalkyl group, a $C_7$–$C_{40}$ alkylaryl group, a $C_8$–$C_{40}$ arylalkenyl group, a $—NR_2^{15}$, $—SR^{15}$, $—OR^{15}$, $—OSiR_3^{15}$ or $—PR_2^{15}$ radical, wherein $R^{15}$ is one of a halogen atom, a $C_1$–$C_{10}$ alkyl group, or a $C_6$–$C_{10}$ aryl group; $R^7$ is

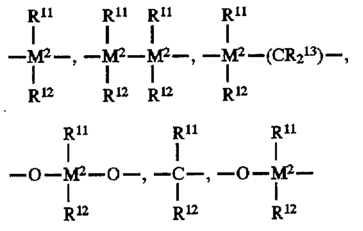

$=BR^{11}$, $=AlR^{11}$, $-Ge-$, $-Sn-$, $-O-$, $-S-$, $=SO$, $=SO_2$, $=NR^{11}$, $=CO$, $PR^{11}$, or $=P(O)R^{11}$;

wherein $R^{11}$, $R^{12}$ and $R^{13}$ are identical or different and are a hydrogen atom, a halogen atom, a $C_1$–$C_{20}$ alkyl group, a $C_1$–$C_{20}$ fluoroalkyl group, a $C_6$–$C_{30}$ aryl group, a $C_6$–$C_{30}$ fluoroaryl group, a $C_1$–$C_{20}$ alkoxy group, a $C_2$–$C_{20}$ alkenyl group, a $C_7$–$C_{40}$ arylalkyl group, a $C_8$–$C_{40}$ arylalkenyl group, a $C_7$–$C_{40}$ alkylaryl group, or $R^{11}$ and $R^{12}$, or $R^{11}$ and $R^{13}$, together with the atoms binding them, can form ring systems;

$M^2$ is silicon, germanium or tin;

$R^8$ and $R^9$ are identical or different and have the meanings stated for $R^{11}$;

m and n are identical or different and are zero, 1 or 2, m plus n being zero, 1 or 2; and the radicals $R^{10}$ are identical or different and have the meanings stated for $R^{11}$, $R^{12}$ and $R^{13}$ and two adjacent $R^{10}$ radicals can be joined together to form a ring system.

23. A method for producing diene-modified propylene polymer, said method comprising combining in a reaction zone under suitable polymerization conditions propylene, one or more α-ω-dienes, and a metallocene catalyst system comprising a metallocene represented by one of the formulas:

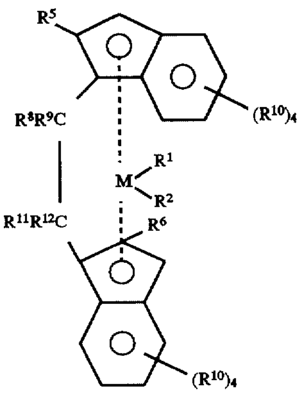

(A)

-continued (B)

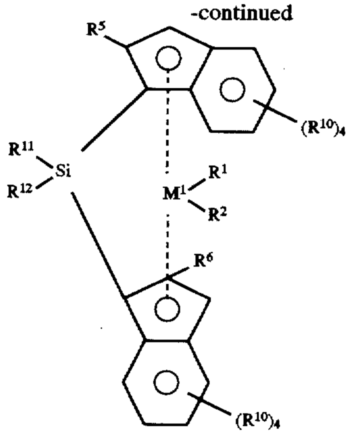

wherein:

$M^1$ is Zr or Hf, $R^1$ and $R^2$ are methyl or chlorine; and $R^5$ and $R^6$ are identical or different, and are one of a halogen atom, a $C_1$–$C_{10}$ alkyl group which may be halogenated, a $C_6$–$C_{10}$ aryl group which may be halogenated, a $C_2$–$C_{10}$ alkenyl group, a $C_7$–$C_{40}$-arylalkyl group, a $C_7$–$C_{40}$ alkylaryl group, a $C_8$–$C_{40}$ arylalkenyl group, a $—NR_2^{15}$, $—SR^{15}$, $—OR^{15}$, $—OSiR_3^{15}$ or $—PR_2^{15}$ radical, wherein $R^{15}$ is one of a halogen atom, a $C_1$–$C_{10}$ alkyl group, or a $C_6$–$C_{10}$ aryl group; $R^{11}$ and $R^{12}$ are identical or different and are a hydrogen atom, a halogen atom, a $C_1$–$C_{20}$ alkyl group, a $C_1$–$C_{20}$ fluoroalkyl group, a $C_6$–$C_{30}$ aryl group, a $C_6$–$C_{30}$ fluoroaryl group, a $C_1$–$C_{20}$ alkoxy group, a $C_2$–$C_{20}$ alkenyl group, a $C_7$–$C_{40}$ arylalkyl group, a $C_8$–$C_{40}$ arylalkenyl group, a $C_7$–$C_{40}$ alkylaryl group, or $R^{11}$ and $R^{12}$, or $R^{11}$ and $R^{13}$, together with the atoms binding them, can form rings systems;

$R^8$ and $R^9$ are identical or different and have the meanings stated for $R^{11}$; m and n are identical or different and are zero, 1 or 2, m plus n being zero, 1 or 2; and the radicals $R^{10}$ are identical or different and have the meanings stated for $R^{11}$, and $R^{12}$ and two adjacent $R^{10}$ radicals can be joined together to form a ring system.

24. A diene modified polymer produced by the method of claim 22.

25. A diene modified propylene polymer comprising propylene units, from about 0.00005 to about 5 mole percent α-ωdiene units wherein the polymer is essentially gel-free and is prepared using a metallocene catalyst system comprising a metallocene represented by one of the formulas:

(A)

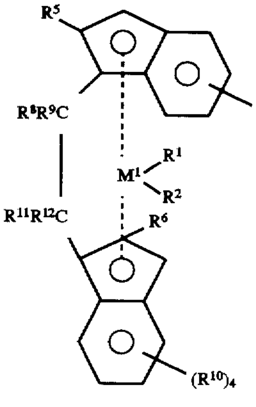

-continued (B)

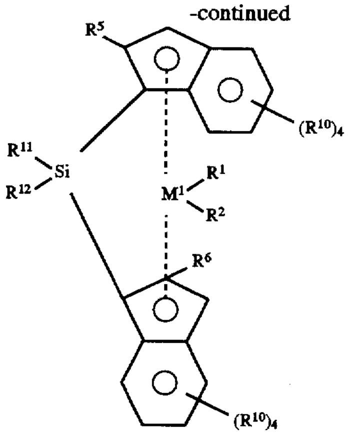

wherein $M^1$ is Zr or Hf, $R^1$ and $R^2$ are methyl or chlorine, and $R^5$ and $R^6$ are identical or different, and are one of a halogen atom, a $C_1$–$C_{10}$ alkyl group which may be halogenated, a $C_6$–$C_{10}$ aryl group which may be halogenated, a $C_2$–$C_{10}$ alkenyl group, a $C_7$–$C_{40}$-arylalkyl group, a $C_7$–$C_{40}$ alkylaryl group, a $C_8$–$C_{40}$ arylalkenyl group, a $—NR_2^{15}$, $—SR^{15}$, $—OR^{15}$, $—OSiR_3^{15}$ or $—PR_2^{15}$ radical, wherein $R^{15}$ is one of a halogen atom, a $C_1$–$C_{10}$ alkyl group, or a $C_6$–$C_{10}$ aryl group; $R^{11}$ and $R^{12}$ are identical or different and are a hydrogen atom, a halogen atom, a $C_1$–$C_{20}$ alkyl group, a $C_1$–$C_{20}$ fluoroalkyl group, a $C_6$–$C_{30}$ aryl group, a $C_6$–$C_{30}$ fluoroaryl group, a $C_1$–$C_{20}$ alkoxy group, a $C_2$–$C_{20}$ alkenyl group, a $C_7$–$C_{40}$ arylalkyl group, a $C_8$–$C_{40}$ arylalkenyl group, a $C_7$–$C_{40}$ alkylaryl group, or $R^{11}$ and $R^{12}$, or $R^{11}$ and $R^{13}$, together with the atoms binding them, can form ring systems;

$R^8$ and $R^9$ are identical or different and have the meanings stated for $R^{11}$;

m and n are identical or different and are zero, 1 or 2, m plus n being zero, 1 or 2; and the radicals $R^{10}$ are identical or different and have the meanings stated for $R^{11}$, and $R^{12}$ and two adjacent $R^{10}$ radicals can be joined together to form a rings system.

26. A diene modified isotactic propylene polymer comprising from about 0.00005 to about 5 mole percent norbornadiene units, wherein the polymer is prepared using a metallocene catalyst system, the polymer is essentially gel-free and has a weight average molecular weight of from about 50,000 to about 700,000.

27. The polymer of claim 26 wherein the norbornadiene is present at a concentration in the range of from about 0.01 to 0.2 mole percent.

28. The polymer of claim 26 wherein the norbornadiene is present at a concentration in the range of from about 0.0005 to about 0.02 mole percent.

29. The polymer of claim 26 wherein the polymer has a viscosity that is higher at 0.1 rad/s as compared to homopolymer that is not modified with norbornadiene when the homopolymer is otherwise prepared under the same conditions.

* * * * *